Figure 1:
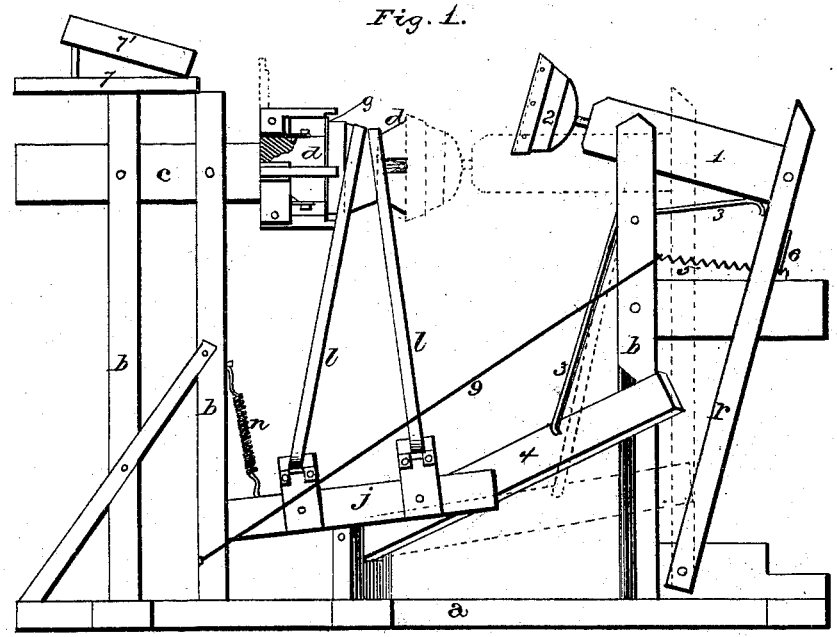
Figure 2:
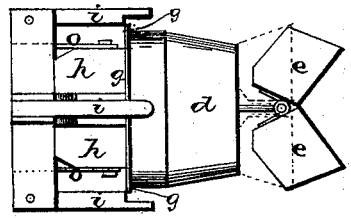
Figure 3:
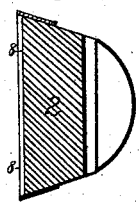

L. PORTER.
MACHINERY FOR MAKING BASKETS.

No. 178,026. Patented May 30, 1876.

WITNESSES. INVENTOR.

UNITED STATES PATENT OFFICE.

LEARTUS PORTER, OF NORTHAMPTON, MASSACHUSETTS.

IMPROVEMENT IN MACHINERY FOR MAKING BASKETS.

Specification forming part of Letters Patent No. 178,026, dated May 30, 1876; application filed December 30, 1875.

*To all whom it may concern:*

Be it known that I, LEARTUS PORTER, of Northampton, in the county of Hampshire and State of Massachusetts, have invented certain new and useful Improvements in Machinery for Making Baskets; and I do hereby declare the following to be a full, clear, and exact description of the invention, such as will enable others skilled in the art to which it pertains to make and use it, reference being had to the accompanying drawings, which form part of this specification.

My invention relates to an improvement in machinery for making baskets; and it consists in the arrangement and combination of devices which will be more fully described hereafter, whereby the basket is held and pressed into shape while being made.

The accompanying drawings represent my invention.

The frame of the machine consists of the ground-sills $a$ and three vertical standards, $b$, suitably braced in position. Passing through the tops of the two posts $b$, placed side by side at one end of the frame, is the horizontal support $c$, the inner end of which forms a pivot, upon which the former $d$ revolves. This former consists of a solid block, of suitable size and shape, to the inner end of which are hinged the two parts $e$, which fit into the bottom of the basket and give it shape. These parts are hinged to the former, so that when the basket is finished and is being drawn off, these parts close outward toward each other, and thus leave the basket free. Around the outer end of the former is formed an iron flange, $g$, against which the rim of the basket rests, and pivoted between ears on the extensions $h$ are the bell-crank levers $i$, which are pressed into position by the flat springs $o$. These levers can be turned outward, as shown, so as not to come in contact with the former, or can be turned down so as to bear against the top of the flange, and thus hold the inner and outer strips that form the rim of the basket, and the ends of the wide, thin strips out of which the basket is woven, while they are being nailed together. In order to hold the basket more readily and easily upon the former during the weaving and nailing operation, there is a foot-lever, $j$, pivoted to the middle standard, to which are attached the two endless bands $l$, which bands pass up, over, and around the former, and clamp the basket to it. To the upper edge of the lever $j$, which is drawn back to position again after being moved by the spring $n$, are two pulleys, around which the belts or bands pass, so that the former can be the more easily revolved around, carrying the bands with it. After one side is finished, the former is turned partially around, and the basket completed either upon one end or the other side. Pivoted to the base of the machine, at or near one end, is a swinging standard, $r$, to the upper end of which is rigidly secured the arm or support 1, upon the inner end of which arm is pivoted the follower 2. Through the top of the standard $b$ is cut a deep recess or slot, through which pass the arm 1 and the strap 3, which strap connects the standard $r$ with the foot-lever 4. By pressing down upon this lever 4 the standard is drawn forward, so as to press the follower tightly against the end of the former, and the standard is held in this position by the ratchet-bar 5 passing through it and the hand-lever 6, which catches in the ratchet. Upon the table 7, within convenient reach of the operator, is placed an inclined nail-box, 7', to hold the nails or tacks used in finishing the basket.

The operation is as follows: A portion of the basket large enough to form the bottom having been woven, it is placed against the inner end of the former, and the follower pressed tightly up against it by bearing down upon the foot-lever 4. All around the inner edge of the follower is a flange, 8, which fits over the edge of the former, and this bends the strips out of which the basket is woven over the sharp edges of the hinged parts $e$, so as to give the bottom a clearly-defined outline. The side is then woven, the hoop or band which is to form the inner side of the rim is placed against the flange $g$, the ends of the strips are trimmed, and the outer hoop around the top of the rim is placed in position and nailed on, the woven part of the basket being held down upon the former by the two bands $l$. After one side or end is formed, the former is turned partially around, carrying the follower with it, and another portion of the basket finished, the finished rim being held in position by means of the spring-levers *i*. The frame is braced and strengthened by suitable wires or braces, 9.

Having thus described my invention, I claim—

1. The combination of the former *d* and the spring-levers *i*, the levers being attached to the former so as to hold the strips on all sides and be raised up out of the way when not wanted, substantially as shown.

2. The former *d*, having the two hinged parts *e* attached to its end, substantially as shown.

3. The combination of the former *d*, spring-levers *i*, flange *g*, and hinged parts *e*, substantially as specified.

4. The combination of the former *d* with one or more bands, *l*, and foot-lever *j*, substantially as shown and described.

5. The combination of the revolving former *d* with the revolving follower 2, substantially as set forth.

6. The combination of the follower 2, arm 1, strap 3, lever 4, standard *r*, and holding device, as described.

In testimony that I claim the foregoing I have hereunto set my hand this 11th day of January, 1875.

LEARTUS PORTER.

Witnesses:
A. PERRY PECK,
CHAUNCEY H. PIERCE.